United States Patent [19]
Lambrecht

[11] 4,155,533
[45] May 22, 1979

[54] MOLD FOR ENCAPSULATING A COMPONENT HAVING NON-AXIAL LEADS

[75] Inventor: Richard A. Lambrecht, Greenville, S.C.

[73] Assignee: Union Carbide Corporation, New York, N.Y.

[21] Appl. No.: 862,556

[22] Filed: Dec. 20, 1977

[51] Int. Cl.² ............................................. B29C 6/04
[52] U.S. Cl. ..................................... 249/95; 249/97; 425/129 R; 425/806
[58] Field of Search ................ 264/272; 249/95–97; 425/129, 806

[56] References Cited
U.S. PATENT DOCUMENTS

| | | | |
|---|---|---|---|
| 3,542,328 | 11/1970 | Deitrick | 249/95 |
| 3,617,876 | 11/1971 | Robinson | 249/97 |
| 3,685,784 | 8/1972 | Spanjer | 249/95 |
| 3,768,945 | 10/1973 | Waid | 425/129 R |
| 3,838,316 | 9/1974 | Brown et al. | 264/272 |

Primary Examiner—Roy Lake
Assistant Examiner—John McQuade
Attorney, Agent, or Firm—Frederick J. McCarthy, Jr.

[57] ABSTRACT

A mold comprising a pair of mold sections which when closed form separate communicating chambers for receiving a component body and a portion of a non-axial lead extending from the component body. Molten plastic introduced into the mold encapsulates the capacitor body while the plastic which surrounds the lead portion is readily detached from the lead portion.

4 Claims, 16 Drawing Figures

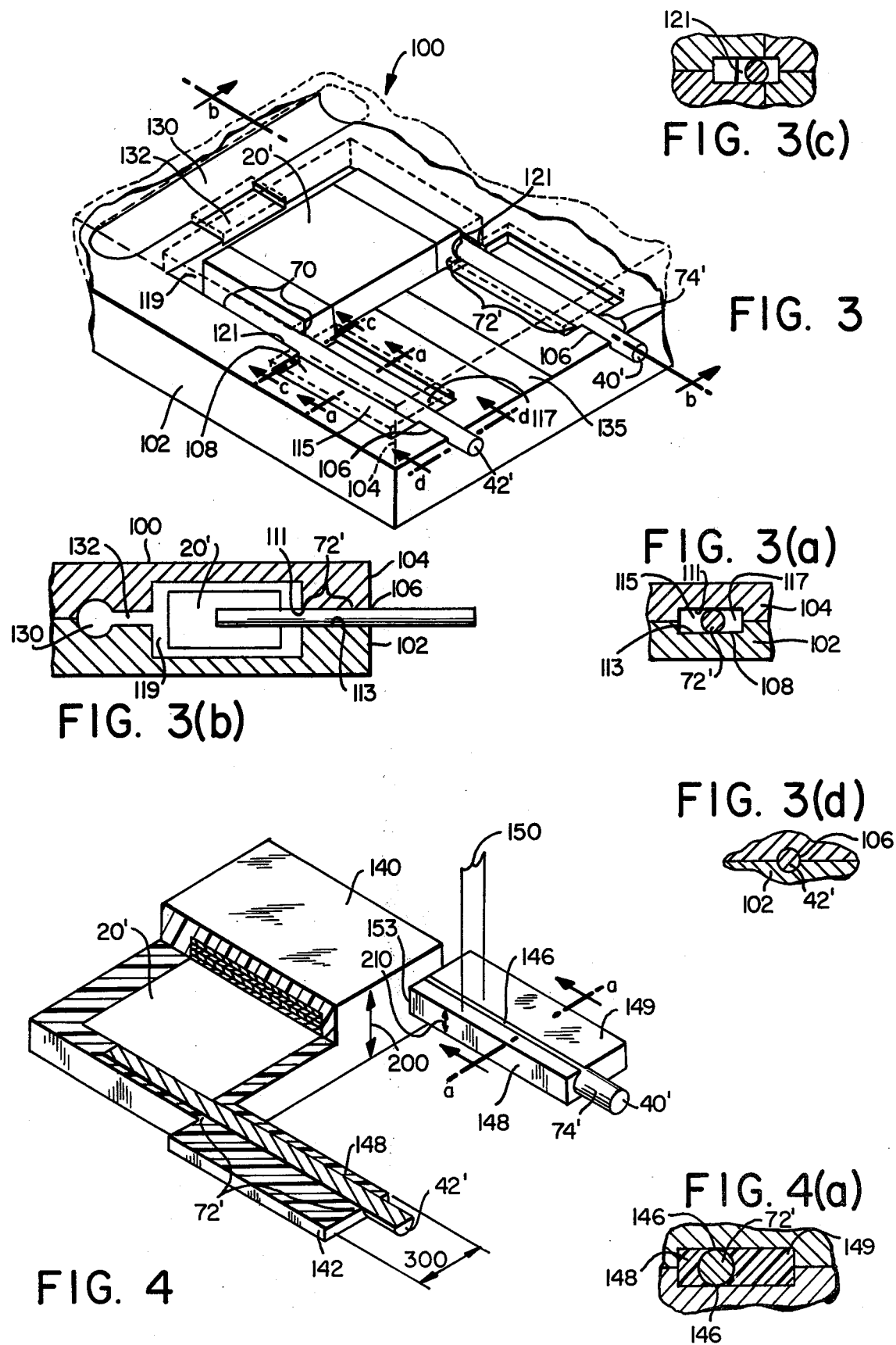

MOLD FOR ENCAPSULATING A COMPONENT HAVING NON-AXIAL LEADS

The present invention relates to molds for encapsulating components. More particularly, the present invention relates to molds for encapsulating components having non-axial leads.

The encapsulating of components with plastic using molds is known to the art, e.g., U.S. Pat. No. 3,542,328, which is directed to the encapsulating of components having leads extending axially therefrom, i.e., an axially leaded component. A different type of component, having non-axial leads, has also been encapsulated with plastic using molds of different design, as hereinafter described. However, the use of such molds has often resulted in the pinching and shearing of component leads and other disadvantages.

It is therefore an object of the present invention to provide a mold for the encapsulation of non-axial leaded components which avoids pinching and shearing damage to the component's leads.

Other objects will be apparent from the following description and claims taken in conjunction with the drawing, wherein FIG. 1 shows a component of the type for encapsulation in accordance with the present invention FIGS. 1(a) and 1(b) are sectional views of the component of FIG. 1 along view lines "a" and "b" respectively of FIG. 1

FIG. 3 is an isometric view of a closed mold in accordance with the present invention FIGS. 3(a), 3(b), 3(c) and 3(d) are sectional view of portions of the mold of FIG. 3 along view lines "a", "b", "c" and "d" respectively of FIG. 3

FIG. 4 shows a component after removal from the mold of FIG. 3

Figure 5:
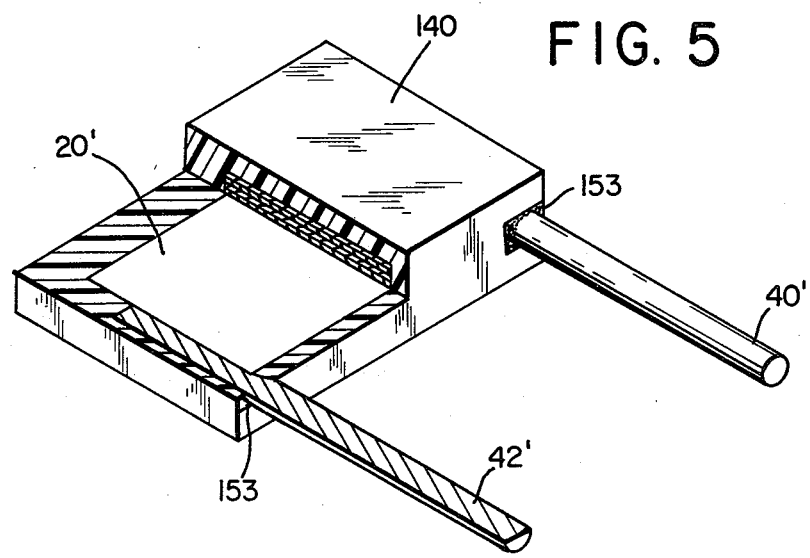
Figure 6:
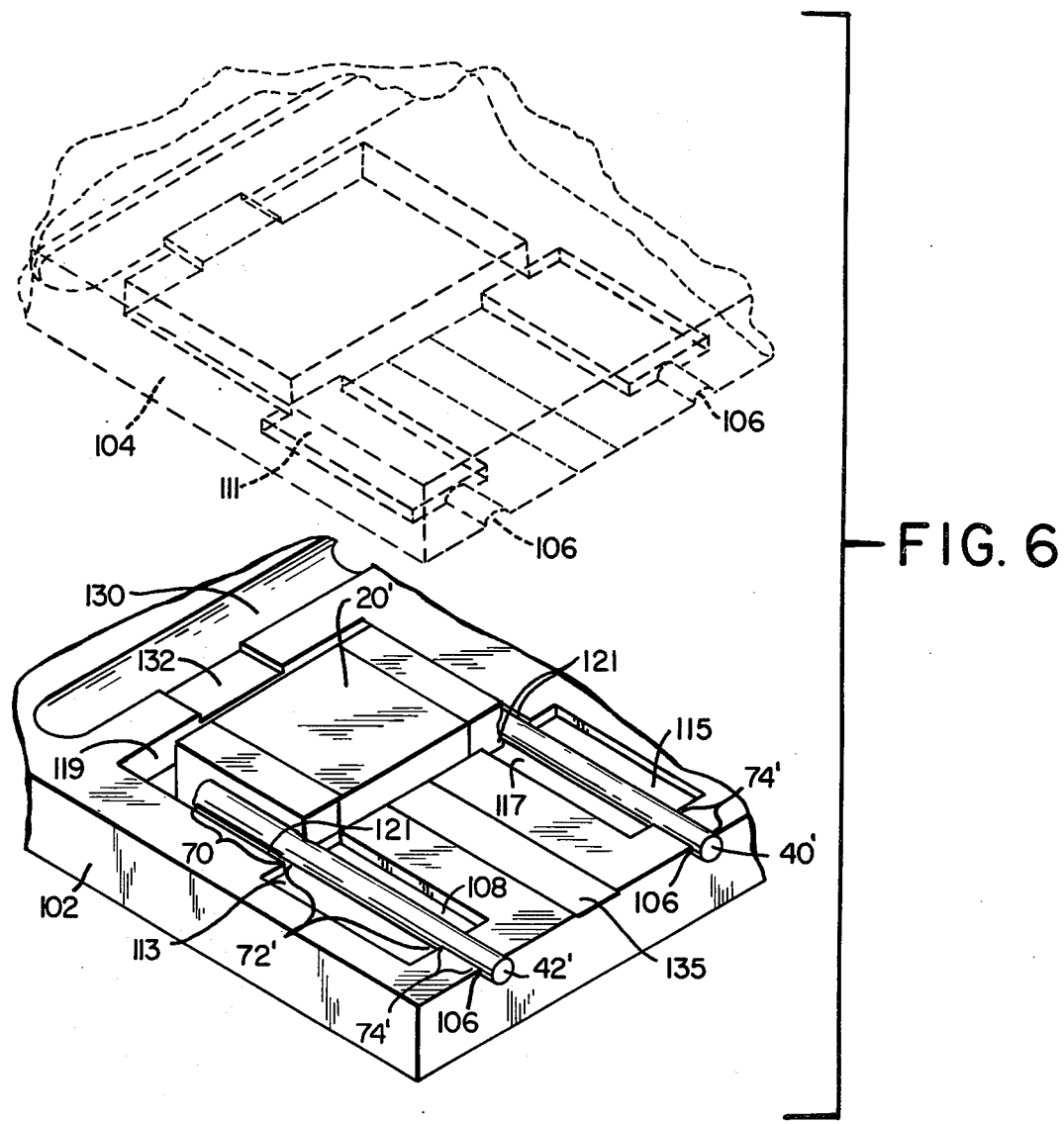
Figure 6A:
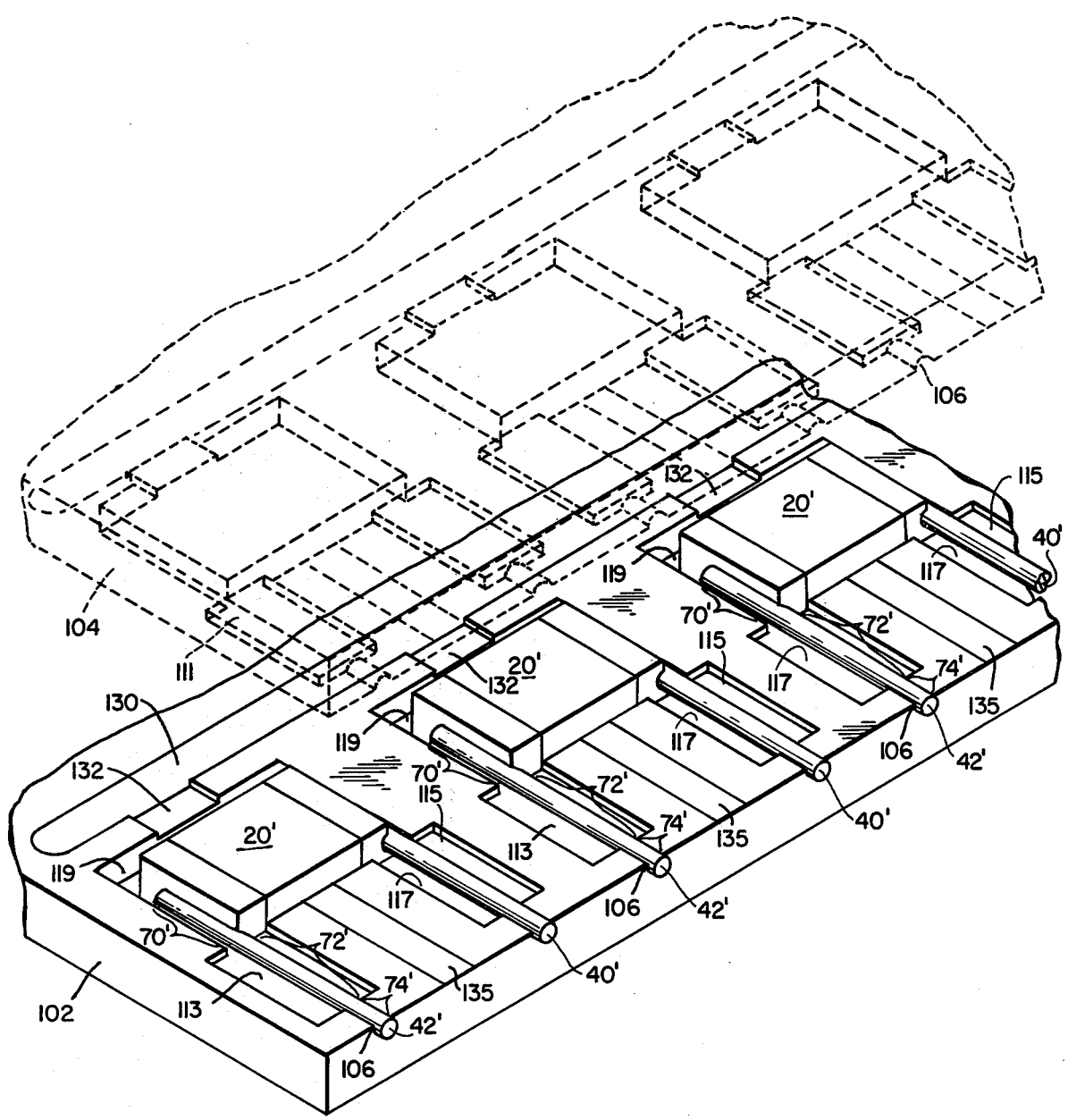

FIG. 4(a) is a sectional view of a portion of the device shown in FIG. 4 along view line "a" of FIG. 4 while still in the mold FIG. 5 shows a molded component provided by the practice of the present invention FIG. 6 shows the mold of FIG. 3 in an open condition FIG. 6(a) shows the broken portion of the mold of FIG. 6 extended to show a plurality of the chambers grooves and passageways illustrated in FIG. 6

Figure 7:
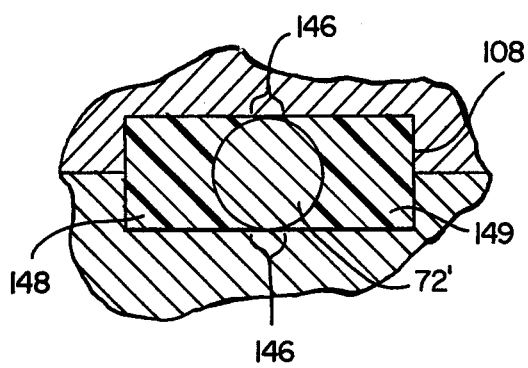

FIG. 7 shows a section of a portion of the mold arrangement of FIG. 3.

Figure 1:
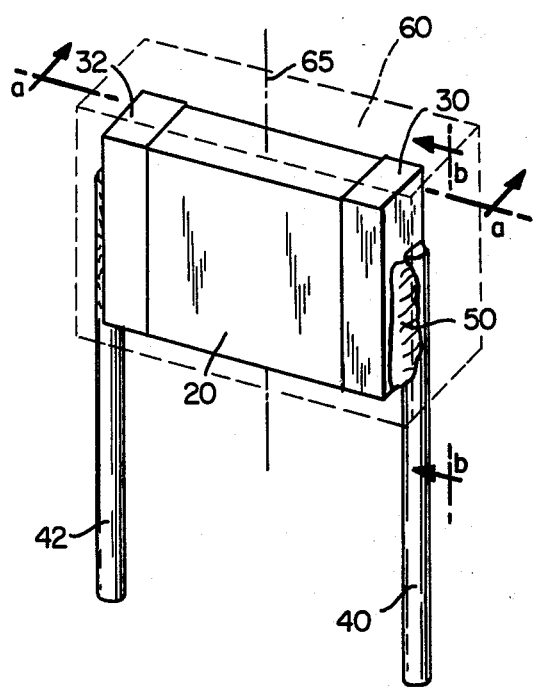
Figure 1A:
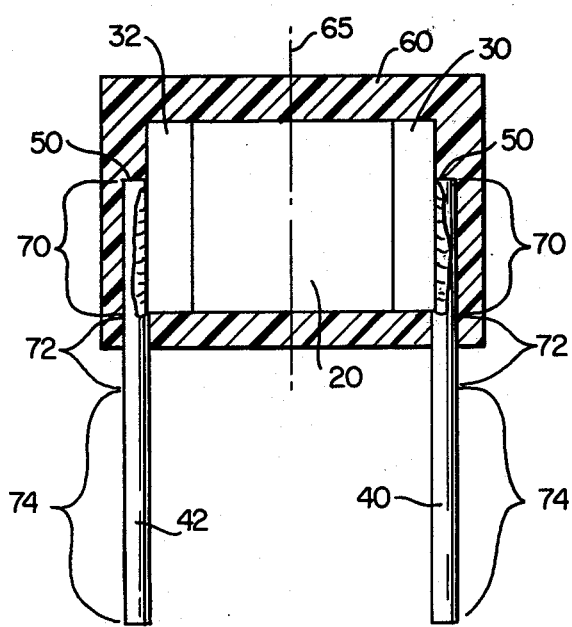
Figure 1B:
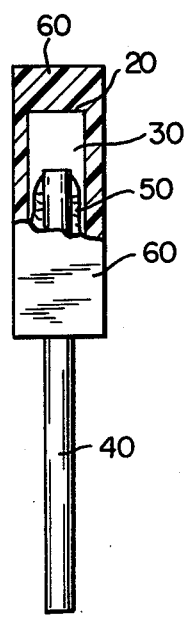
Figure 2:
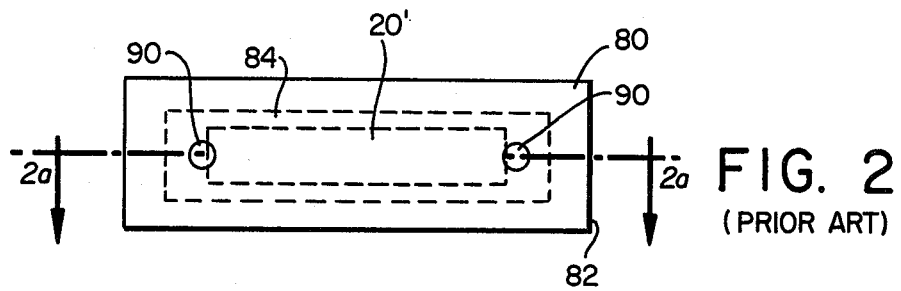
FIGS. 2 and 2(a) are views of a prior art molding technique, FIG. 2(a) being sectioned along view line 2(a) of FIG. 2
Figure 2A:
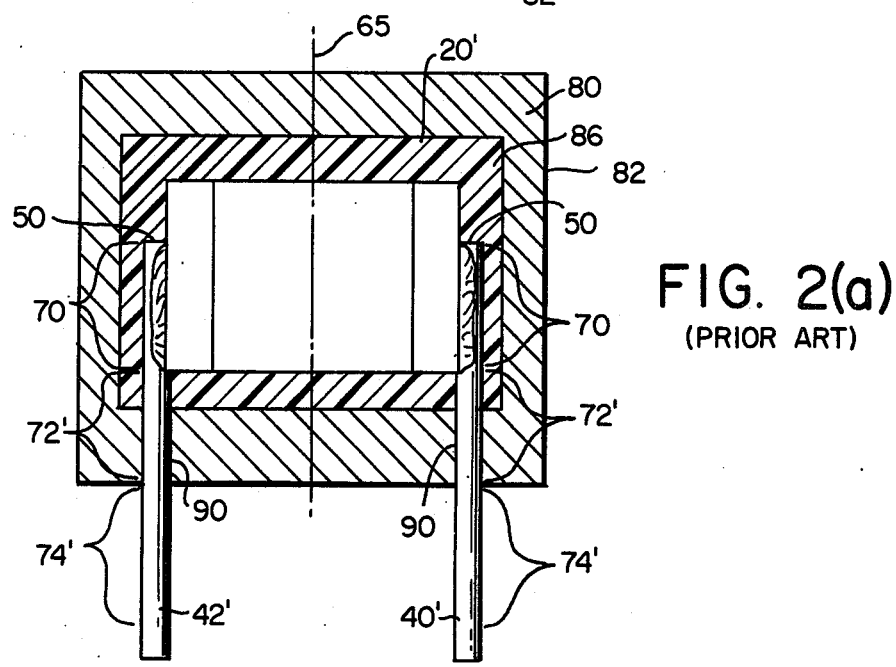

With reference to the drawings, FIG. 1 shows a component of the type which can be encapsulated using the mold of the present invention. In FIG. 1 the component is a conventional ceramic capacitor having a slab-shaped ceramic body 20 with metal terminations 30, 32 to which leads 40, 42 are attached, e.g., by solder as shown at 50. It is frequently desirable to provide such components with a plastic encapsulation as shown at 60 in FIGS. 1(a) and 1 (b). As shown in FIGS. 1 and 1(a), the leads 40, 42 are not in line with a central axis 65 of the component body 20, i.e., the leads are not "axial" and comprise a portion 70 which is adjacent to the component body 20, an elongate intermediate portion 72 which extends substantially parallel to the axis 65 of the capacitor body, and a terminal portion 74 remote from component body 20. In the past such components have been encapsulated using conventional mold of the type shown in FIG. 2 comprising two metal mold halves 80, 82 which when closed as shown in FIG. 2 form a chamber 84 to receive a component body 20'. Molten plastic is conventionally introduced into the chamber 84 which solidifies in situ in the mold and forms an encapsulation 86 shown in the sectional view of FIG. 2(a). As can be seen from FIG. 2(a), in order to avoid pinch or shear damage to leads 40', 42' the intermediate lead portion 72' must mate closely with grooves 90 in mold 80. It is not unusual, in commercial operations, to have situations where intermediate portions 72' do not precisely "line up" with the grooves 90, which results in lead damage.

In the present invention, these difficulties are avoided by a mold such as shown in FIG. 3. With reference to FIG. 3, a mold 100 comprises mold halves 102 and 104; mold half 104 is essentially identical to mold half 102 and is shown in dotted lines for purposes of clarity. FIG. 6 shows the mold of FIG. 3 "opened".

FIG. 6(a) shows the broken portion of FIG. 6 extended having a plurality of chambers, grooves and passageways corresponding to those illustrated in FIG. 6. With the mold halves closed as shown in FIG. 3, grooves 106 are formed which closely engage lead portions 74' and essentially sealably close the mold while positioning leads 40', 42'. A pair of first chambers 108 are formed by the mold halves for receiving intermediate lead portions 72'. In chambers 108, as shown in FIG. 3(a) the opposing inner surfaces 111, 113, which define the depth of chamber 108, closely contact intermediate lead portion 72' which thus partitions chamber 108 into compartments 115, 117 on each side of intermediate portion 72' and due to the lateral space thus provided in chambers 108, variations in the size, shape and length of the intermediate lead portion 72', and component body 20', can be accommodated. With reference to FIG. 3(b), the close fitting contact of surfaces 111, 113 with elongate intermediate lead portion 72' provides support for component body 20' which is received by second chamber 119 which has a greater depth than chamber 108. Passageways 121 shown in FIG. 3 which are relatively narrow, e.g., about 2 to 3 times the cross-section of lead portion 72', are formed by the portion of chambers 108 which are contiguous to chamber 119 and receive adjacent lead portions 70 and provide a path for molten plastic to each compartment 115, 117 of chambers 108. Passageways 121, as shown in FIG. 3, are substantially respectively in alignment with grooves 106 to accommodate leads 40', 42' which are parallel to the axis of component body 20'. Passageways 121, while relatively narrow, are wide enough to accommodate a variation in the spacing between leads 40' and 42' which may occur due to dimensional variation of component body 20'. In operation, molten plastic is conventionally introduced into the mold 100 from runner 130 through gate 132 into chamber 119 and through passageways 121 into compartments 115, 117 of chambers 108. Gases in the mold exit vent 135 and the plastic is prevented from running out of the mold by the sealing engagement of terminal lead portions 74' in grooves 106. Upon opening of the mold after in situ solidification of the molten plastic, the encapsulated capacitor has the configuration shown in FIG. 4, the plastic encapsulation of capacitor body 20' being indicated at 140 and the resulting partial encapsulation of intermediate lead portions 72' being shown at 148 and 149. As can be seen from FIG. 4 and FIG. 4(a) the surface portions 146 of intermediate lead portion 72' are not coated with plastic because of the above-mentioned supporting contact with the opposed inner surfaces of chambers 108. Consequently, as is known in the art, these relatively massive flash portions, i.e., tabs, 148 and 149 can be conventionally removed, e.g., by forces applied as shown at 150 using known de-flashing devices which break the tabs at the edge interface 153 to provide a finished encapsulated product as shown in FIG. 5.

In a preferred embodiment of the present invention, the opposing surfaces of the mold halves which form chambers 108, FIG. 3, deform the cross section of intermediate lead portion 72', as shown in FIG. 7 to ensure firm support for the component in the mold and also provide substantially flat area, 146, 10° to 20° on each side, which will not be enclosed with plastic thus facilitating the deflashing of the solidified plastic tabs 148 and 149 attached to intermediate lead portions 72'.

Also in the preferred embodiment of the invention, 119 shown in FIG. 3, has a depth, represented at 200 in FIG. 4 which is from 2 to 4 times the depth of chambers 108 represented at 210 in FIG. 4, in order to facilitate "deflashing". The width of chambers 108 shown in FIG. 3 is represented at 300 in FIG. 4 and is about 2 to 4 times the cross section of intermediate lead portion 72' to facilitate "deflashing".

I claim:

1. A mold for encapsulating a component with molten plastic which solidifies in situ in said mold, said component having a body and a non-axial lead substantially parallel to the axis of said body and extending from said body, said lead having a portion adjacent to said body, an elongate intermediate portion and a terminal portion remote from said body, said mold comprising a pair of mold halves which when closed form a groove for receiving the terminal portion of said lead and substantially sealably engaging the lead at the terminal portion thereof; a first chamber for receiving the intermediate lead portion, said first chamber being contiguous with said groove and having inner opposed surfaces formed by respective mold halves which define the depth of said first chamber for closely contacting the intermediate lead portion to provide support for the component in said mold and provide compartments in said first chamber on each side of the elongate intermediate lead portion; a second chamber having a depth greater than said first chamber for receiving the body; a passageway from said first chamber to said second chamber substantially in alignment with said groove to receive the lead portion adjacent to the body and provide a path for molten plastic between each compartment in said first chamber and said second chamber.

2. A mold in accordance with claim 1, which when said pair of mold halves are closed forms an elongate runner cavity adjacent said second chamber for receiving molten plastic and a passageway between said runner cavity and said second chamber for the passage of molten plastic into said second chamber and said first chamber.

3. A mold in accordance with claim 1, which when said pair of mold halves are closed forms a plurality of first chambers, grooves, second chambers and for encapsulating a plurality of components.

4. A mold in accordance with claim 1 wherein the width of said passageway is about 2 to 3 times the diameter of the cross-section of a component lead portion received therein.

* * * * *